United States Patent
Palenius et al.

(10) Patent No.: US 12,238,678 B2
(45) Date of Patent: Feb. 25, 2025

(54) SYSTEMS, METHODS, AND COMPUTER PROGRAM PRODUCTS FOR PROVIDING A WAIT INDICATION FOR A DELAYED PAGING OPERATION

(71) Applicant: SONY CORPORATION, Tokyo (JP)

(72) Inventors: Torgny Palenius, Barseback (SE); Lars Nord, Lund (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 710 days.

(21) Appl. No.: 17/281,096

(22) PCT Filed: Sep. 16, 2019

(86) PCT No.: PCT/US2019/051259
§ 371 (c)(1),
(2) Date: Mar. 29, 2021

(87) PCT Pub. No.: WO2020/076460
PCT Pub. Date: Apr. 16, 2020

(65) Prior Publication Data
US 2021/0345291 A1    Nov. 4, 2021

(30) Foreign Application Priority Data
Oct. 11, 2018    (SE) .................................. 1830288-5

(51) Int. Cl.
*H04W 68/00*    (2009.01)
*H04W 60/04*    (2009.01)
*H04W 74/0833*    (2024.01)

(52) U.S. Cl.
CPC ......... *H04W 68/005* (2013.01); *H04W 60/04* (2013.01); *H04W 74/0833* (2013.01)

(58) Field of Classification Search
None
See application file for complete search history.

(56) References Cited

U.S. PATENT DOCUMENTS

2016/0270027 A1    9/2016    Ang et al.
2017/0041900 A1    2/2017    Wallentin et al.
(Continued)

OTHER PUBLICATIONS

Catt, Solution on Delayed MT data transmission for power saving, 3GPP TSG-SA WG2 Meeting #128, S2-186911, Jul. 2-6, 2018, Vilnius, Lithuania, pp. 1-3. (Year: 2018).*
(Continued)

*Primary Examiner* — Kouroush Mohebbi
(74) *Attorney, Agent, or Firm* — Myers Bigel, P.A.

(57) ABSTRACT

A method of managing a paging message for a user Equipment (UE) in a wireless communication network includes transmitting the paging message to the UE in the wireless communication network, receiving a wait indication from the UE, and delaying a retransmission of the paging message to the UE responsive to receiving a wait indication from the UE. A method of operating a UE in a wireless communication network includes receiving a paging message from a network node, and, responsive to receiving the paging message, transmitting a wait indication to the network node indicating a delay in transmission of a response to the paging message.

18 Claims, 7 Drawing Sheets

(56) References Cited

U.S. PATENT DOCUMENTS

2018/0235003 A1* 8/2018 Wong .................... H04L 1/1671
2020/0383086 A1* 12/2020 Lanev ............... H04W 52/0235

OTHER PUBLICATIONS

PCT Notification Concerning Transmittal of International Preliminary Report on Patentability (Chapter I of the Patent Cooperation Treaty), mailed Apr. 22, 2021, for corresponding PCT International Application No. PCT/US2019/051259.

PCT Written Opinion of the International Searching Authority, mailed Dec. 6, 2019, for corresponding PCT International Application No. PCT/US2019/051259.

PCT International Search Report, mailed Dec. 6, 2019, for corresponding PCT International Application No. PCT/US2019/051259.

CATT: "Solution on Delayed MT data transmission for power saving", 3GPP Draft; S2-186911_Solution on Delayed MT Data Transmission for Power Saving, 3rd Generation Partnership Project (3GPP), vol. SA WG2, No. Vilnius, Lithuania; Jul. 2-Jul. 6, 2018 Jul. 1, 2018 (Jul. 1, 2018), XP051470050, Retrieved from the Internet: URL:http://www.3gpp.org/ftp/Meetings%5F3GPP%5FSYNC/SA2/Docs. [retrieved on Jul. 1, 2018].

NEC: "Key Issue #5 Solution: Paging for delay tolerant applications in the UE", 3GPP Draft; S2-184718—FS-CIOT-5G-KI-5-Paging for Delay Tolerant Applications in the UE, 3rd Generation Partnership Project (3GPP), vol. SA WG2, No. Newport Beach, USA; May 28-Jun. 1, 20180528 - 20180601 May 27, 2018 (May 27, 2018), XP051448244, Retrieved from the Internet: URL:http://www.3gpp.org/ftp/Meetings%5F3GPP%5FSYNC/SA2/Docs/[retrieved on May 27, 2018].

Sony et al: "Update to Solution 33: Delayed paging response", 3GPP Draft; S2-187231 Was S2-186342 Update to Delayed Page Response, 3rd Generation Partnership Project (3GPP), Mobile Competence Centre ; 650, Route Des Lucioles ; F-06921 Sophia-Antipolis Cedex; FR I vol. SA WG2, No. Vilnius, LT; Jul. 2-Jul. 6, 2018 Jul. 6, 2018 (Jul. 6, 2018), XP051538644, Retrieved from the Internet: URL:http://www.3gpp.org/ftp/tsg%5Fsa/WG2%5 FArch/TSGS2%5F128%5FVilnius/Docs/S2%2D187231%2Ezip.

First Office Action and Search Report corresponding to Chinese Application No. 201980064837.3; issued Dec. 27, 2023 (20 pages, including English translation).

* cited by examiner

SYSTEMS, METHODS, AND COMPUTER PROGRAM PRODUCTS FOR PROVIDING A WAIT INDICATION FOR A DELAYED PAGING OPERATION

CROSS-REFERENCE TO RELATED APPLICATIONS

The present application is a 35 U.S.C. § 371 national stage application of PCT Application No. PCT/US2019/051259, filed Sep. 16, 2019, which itself claims priority to Swedish Patent Application No. 1830288-5, filed Oct. 11, 2018, the entire contents of both of which are incorporated herein by reference in their entireties. The above-referenced PCT Application was published in the English language as International Publication No. WO 2020/076460 A1 on Apr. 16, 2020.

FIELD

The present inventive concepts relate generally to wireless communication networks and, more particularly, user equipment (UE) paging communications in wireless communication networks.

BACKGROUND

Wireless communication networks, such as those based on the 3rd Generation Partnership Project (3GPP) defined Universal Mobile Telecommunications System (UMTS) and Long Term Evolution (LTE) architecture, are able to support more sophisticated services than simple voice and messaging services offered by previous generations of wireless communication networks. For example, with the improved radio interface and enhanced data rates provided by LTE systems, a user is able to enjoy high data rate applications such as mobile video streaming and mobile video conferencing that would previously only have been available via a fixed line data connection. The demand to deploy improved networks is therefore strong and the coverage area of these networks, i.e. geographic locations where access to the networks is possible, is expected to increase rapidly.

There is expected to be an increasing need for future wireless communications networks to efficiently support communications with a wider range of devices associated with a wider range of data traffic profiles and types than supported by current systems. For example, it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things" (IoT), and may typically be associated with the transmissions of relatively small amounts of data with relatively high latency tolerance, whereas other types of device, for example supporting high-definition video streaming, may be associated with transmissions of relatively large amounts of data with relatively low latency tolerance.

In view of IoT and other advances, there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

5G is the new generation of radio systems and network architecture delivering extreme broadband and ultra-reliable, low latency connectivity and massive networking for the IoT to enable the programmable world. Example use cases currently of interest for next generation wireless communication systems include so-called Narrowband IoT (NB-IoT), defined in the 3GPP Release 13.

The desire to efficiently support transmissions for different services with different characteristics in a wireless communication network gives rise to new challenges to be addressed to help improve the operation of wireless communication networks.

SUMMARY

The inventive concepts described herein utilize a wait indication in reply to a paging message that supports a delayed response. By providing the wait indication, a UE may inform the network that the paging message has been received, but that the response will be delayed until the radio connection between the UE and the network has improved. The use of the wait indication may allow the network to avoid additional retransmissions of the paging message, further saving power. In addition, the wait indication provides an indication of the status of the UE to the network, which may allow the network to better schedule future interactions with the UE.

According to some embodiments of the inventive concepts, a method of operating a user equipment (UE) in a wireless communication network includes receiving a paging message from a network node, and responsive to receiving the paging message, transmitting a wait indication to the network node indicating a delay in transmission of a response to the paging message.

In some embodiments, the paging message comprises a delayed paging indicator that indicates that a delayed response to the paging message is supported.

In some embodiments, the method further includes transmitting a support message indicating support for a delayed response to the paging message.

In some embodiments, the wait indication is provided as part of a connection procedure between the UE and the network node.

In some embodiments, the wait indication comprises a random access channel (RACH) preamble.

In some embodiments, the wait indication comprises a portion of a random access channel (RACH) Msg3.

In some embodiments, the wait indication is transmitted as part of a random access procedure between the UE and the network node In some embodiments, the wait indication is transmitted in response to a random access channel (RACH) random access response that is received by the UE from the network node.

In some embodiments, the wait indication is a first wait indication, and the method further includes transmitting a second wait indication from the UE to the network node.

In some embodiments, the second wait indication indicates a further delay based on a channel condition between the UE and the network node.

In some embodiments, the method further includes transmitting a registration message indicating support for a delayed response to the paging message.

In some embodiments, transmitting the wait indication is based on a channel condition between the UE and the network node.

According to some embodiments of the inventive concepts, a UE used in a wireless communication network performs operations including receiving a paging message from a network node over the wireless communication network, and responsive to receiving the paging message, transmitting a wait indication to the network node indicating a delay in transmission of a response to the paging message.

According to some embodiments of the inventive concepts, a computer program product includes a tangible, non-transitory computer readable storage medium comprising computer readable program code embodied therein, the computer readable program code including computer readable code to receive a paging message at a User Equipment (UE) from a network node over a wireless communication network, and computer readable code to transmit, responsive to receiving the paging message, a wait indication to the network node indicating a delay in transmission of a response to the paging message.

According to some embodiments of the inventive concepts, a method for managing a paging message for a UE in a wireless communication network includes transmitting the paging message to the UE in the wireless communication network, receiving a wait indication from the UE, and delaying a retransmission of the paging message to the UE responsive to receiving the wait indication from the UE.

In some embodiments, the paging message comprises a delayed paging indicator that indicates that a delayed response to the paging message is supported.

In some embodiments, the paging message comprises the delayed paging indicator responsive to a determination that a response to the paging message is delay tolerant.

In some embodiments, the wireless communication network comprises a network node, and the wait indication is provided as part of a connection procedure between the UE and the network node.

In some embodiments, the wait indication comprises a random access channel (RACH) preamble.

In some embodiments, the wait indication comprises a portion of a random access channel (RACH) Msg3.

In some embodiments, the wait indication is transmitted as part of a random access procedure between the UE and the network node In some embodiments, the wireless communication network includes a network node, and the method further includes receiving the wait indication in response to a random access channel (RACH) random access response that is transmitted from the network node to the UE.

In some embodiments, the wireless communication network includes a core network, and the method further includes responsive to receiving the wait indication, transmitting a status message to the core network, wherein the status message indicates that the UE has provided a wait indication.

In some embodiments, the wait indication is a first wait indication, and the method further includes receiving a second wait indication from the UE.

In some embodiments, the second wait indication indicates a further delay based on a channel condition between the UE and the network node of the wireless communication network.

In some embodiments, the method further includes receiving a registration message from the UE indicating support for a delayed response to the paging message.

In some embodiments, the wait indication is based on a channel condition between the UE and the network node of the wireless communication network.

In some embodiments, the wait indication is received in response to the paging message that is transmitted from a network node to the UE.

According to some embodiments of the inventive concepts, a network node in a wireless communication network performs operations including transmitting a paging message to a user Equipment (UE) in the wireless communication network, receiving a wait indication from the UE, and responsive to receiving the wait indication from the UE, delaying a retransmission of the paging message to the UE.

According to some embodiments of the inventive concepts, a computer program product includes a tangible, non-transitory computer readable storage medium comprising computer readable program code embodied therein, the computer readable program code including computer readable code to transmit a paging message to a user Equipment (UE) in a wireless communication network, computer readable code to receive a wait indication from the UE, and computer readable code to delay a retransmission of the paging message to the UE responsive to receiving the wait indication from the UE.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth to provide a thorough understanding of embodiments of the present disclosure. However, it will be understood by those skilled in the art that the present invention may be practiced without these specific details. In some instances, well-known methods, procedures, components, and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

If a UE is paged with an indicator that the downlink (DL) data is not delay sensitive, then the UE may respond to the network with a wait indication if the radio channel is poor. The wait indication may allow the network to improve the paging procedure and inform an application server about the UE status. The paged UE may be able to transition to a better radio condition and may save overall power consumption by responding to the paging message in the better radio condition compared to responding directly in the poor radio condition. In addition, other UEs in the same paging group may also save power since the paging repetition and escalation is not needed.

In a wireless communication network in which a Delayed Paging response is supported for paging messages, the inventive concepts described herein provide multiple technical advantages. For example, when a UE estimates that power can be saved by delaying a response to a paging message, the UE may send a wait indication indicating that the UE will delay the response to the paging message. For example, delaying the message may provide a power savings to the UE. As a result, the base station and/or core network may be informed that the response to the paging message will be received later, and the base station and/or core network will not have to send any further page messages to the UE. Consequently, paging resources may be reduced, which may be especially important in scenarios in which the paging message would otherwise be escalated into a larger paging area. A further technical advantage is that other UEs in the same paging group will not receive unnecessary paging messages and/or be woken up to check whether a paging message was intended for them. A further technical advantage is that the wait indication described herein may provide an opportunity to inform an Application Server about the UE status, and that the UE may be available to respond at a later time.

Figure 1:
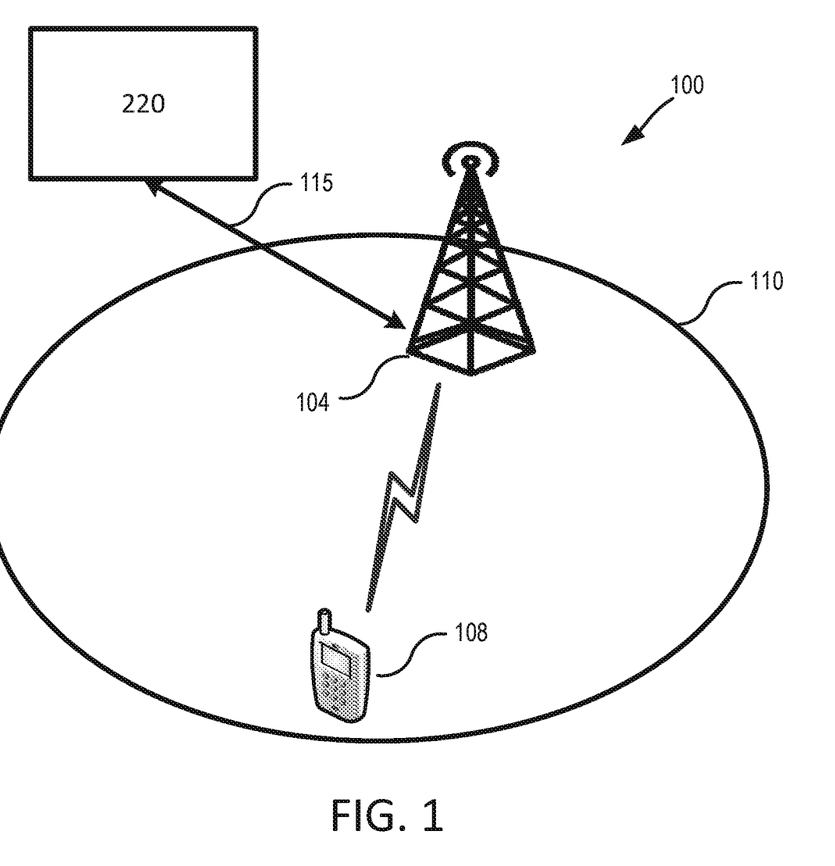
FIG. 1 is a block diagram of a wireless communication network within a cell having a base station in communication with a UE.

FIG. 1 illustrates a wireless communication network 100 within a cell 110 having a base station 104 with a UE 108. The UE 108 may be in wireless communication with the base station 104. The base station 104 may be a station that communicates with the UE 108 and may also be referred to as a node B, an access point, an enhanced node B (eNB) a next-generation node B (gNB) and the like. The base station 104 can be responsible for mobility and can also be responsible for radio resource control (RRC) signaling. In some embodiments, the wireless communication network 100 may provide a Uu radio interface between the UE 108 and the base station 104 to facilitate radio communications therebetween.

The base station 104 may be a network node of the wireless communication network 100, and may provide communication coverage for a particular geographic area, such as that covered by the cell 110. The base station 104 may be further connected to a core network (CN) 220. In some embodiments, the wireless communication network 100 can be a 3GPP LTE network and the base station 104 can be an eNB apparatus, a gNB apparatus, or a base station subsystem (BSS), nevertheless the example is not limited to this type of network. As an example, the wireless communication network 100 can be a 5G, New Radio (NR), LTE, UMTS, Global System for Mobile (GSM), General Packet Radio Services (GPRS), and/or Enhanced Data for Global Evolution (EDGE) networks. Depending on the type of network, the base station 104 can be of different types and can be interconnected within the wireless communication network in different ways. The base station 104 is therefore not limited to an eNB/gNB and can comprise any device suitable to provide a wireless connection to UE 108. In addition, various network node names and message names are used herein to describe entities and messages in the wireless communication network. For convenience, the network node names and message names used include those from an EPC/LTE system, but it should be understood that corresponding nodes and messages in the 5G system can also apply.

In some embodiments, base station 104 can be connected via an interface 115 to the core network 220. In some embodiments, the core network 220 may include servers and/or databases for providing services (such as data communications, voice calls, and/or VoIP calls) to the UE 108 connected via the wireless communication network 100. In particular, the core network 220 may include Mobility Management Entities (MMEs), Applications Servers, and Gateways for connection with other networks. In a 5G system, the MME functionality may be divided into multiple parts, such as an Access and Mobility Management Function (AMF), a Session Management Function (SMF), and/or a User Plane Function (UPF). The AMF may be responsible for paging messages to the UE 108. Communication between the core network 220 and the UE 108 may be relayed by the base station 104. For example, base station 104 may relay a communication from the core network 220 but the base station 104 is not aware of the context of the data. In other words, the base station 104 may relay the communication that is directly between the core network 220 and the UE 108.

An objective of the NB-IoT is to specify a radio access for cellular internet of things (cIoT) that addresses improved indoor coverage, support for a massive number of low throughput devices, low delay sensitivity, ultra-low device cost, low device power consumption, and/or optimized network architecture.

NB-IoT provides approaches regarding paging procedures that accommodate the potential for longer idle times in IoT devices and lower power consumption. In NB-IoT, a system frame number (SFN)-based discontinuous reception (DRX) or extended DRX (eDRX) with a paging time window (PTW) may be used. DRX and eDRX are methods used in mobile communication networks to conserve the battery of a UE 108. The UE and the mobile communication network negotiate phases in which downlink (DL) data transfer may occur and/or the idle mode DRX/eDRX interval. During other times, the UE may turn its receiver off and enter a low power state. The UE 108 may monitor all its paging occasions (POs) in the PTW. In some embodiments, the extended DRX cycle length and PTW size may be negotiated between the UE and CN during ATTACH/tracking area update (TAU). In some embodiments, the paging messages to the UE 108, including retransmissions of the paging messages, may be controlled by the core network 220, and may be relayed to the UE by the base station 104. In some embodiments, the paging messages to the UE 108, including retransmissions of the paging messages, may be controlled by the base station 104.

In order for a UE 108 to enhance the power consumption when the network is sending a paging message to tell the UE 108 there is downlink (DL) data waiting, it has been proposed to add an option to the paging communication between the UE 108 and the base station 104 (e.g., an eNB/gNB). For example, an option may allow the UE 108 to wait to transmit a paging response in certain conditions (e.g., when the condition of the radio network between the UE 108 and the base station 104 is poor). By delaying the paging response until the condition of the radio network improves, a power consumption of the UE 108 may be improved. For example, the estimated uplink (UL) power to reach the base station 104 when the condition of the radio network is good may be less than when the condition of the radio network is poor. As a result, by waiting for the condition of the radio network to improve, the UE 108 may be able to reduce the amount of power needed for the UL operation. Thereby power consumption of the UE 108 can be enhanced since the transmission power is reduced and, in some cases, retransmissions can be avoided.

In addition, a paging message is often a prelude to the UE 108 performing a DL operation to download data. Delaying the response to the paging message may also delay the DL operation which was the rationale for the paging message. By delaying the response until a better channel condition exists, an increased datarate may be achieved for a fixed data allocation since the efficient coding rate can be higher (less redundancy bits). The increased datarate may reduce a communication time used for the DL operation, and thereby the power consumption may be reduced.

The option to allow the UE 108 to wait to transmit a paging response will be referred to herein as Delayed Paging and/or Delayed Paging response. In some embodiments, the UE 108 may indicate its support for Delayed Paging to the base station 104 (e.g., during registrations with the network). Delayed Paging is proposed in "3GPP; Technical Specification Group Services and System Aspects; Study on Cellular IoT support and evolution for the 5G System (Release 16) v1.0.0 (2018 September)," Solution 33, pp 192-195.

Delayed Paging may be used when the service to which the paging message is related is insensitive to delays and when the UE 108 has been configured with a delayed paging response window. In some embodiments, the delayed paging response windows is a time duration in which the UE 108 may respond to the paging message, and may be negotiated between the UE 108 and the network. In some embodiments, an indication may be sent in the paging message indicating to the UE 108 that the service to which the paging message is related is time insensitive so that a delayed paging response within the response window is allowed.

Figure 2:
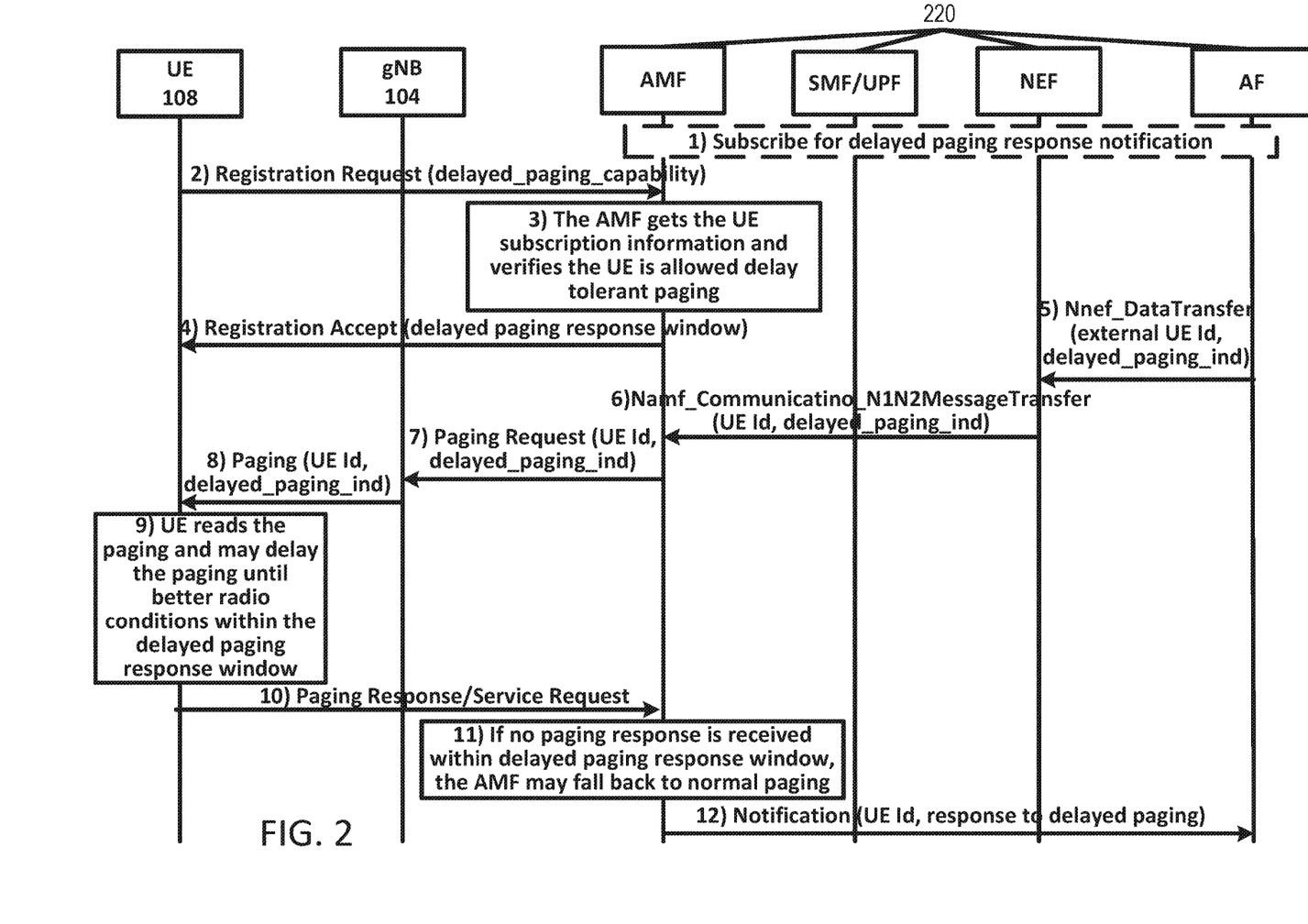
FIG. 2 is a schematic diagram illustrating a delayed paging operation between a UE connected to a core network via a base station.

The use of Delayed Paging provides enhancements for power consumptions that allow the UE 108 to wait for a better occasion to transmit a paging response to the network. FIG. 2 is a schematic diagram illustrating a delayed paging operation between a UE 108 connected to a core network 220 via a base station (gNB) 104. The core network 220 may include, for example, an Application Function (AF), a Network Exposure Function (NEF), a Session Management Function (SMF)/User Plane Function (UPF), and/or an Access and Mobility Management Function (AMF). The AF can reside within the operator domain (e.g., inside the 3GPP network) or outside (e.g. an external network and/or the Internet). The NEF node in 5G core may handle (based on information from the AMF) notification to the AF outside the 3GPP domain.

As illustrated in FIG. 2, in a step 1 of the delayed paging operation, an AF may subscribe with the SMF/UPF/AMF for delayed paging response (e.g. to be notified when the UE 108 responds to delayed paging). The AF may also provision the delayed tolerant service level information via the NEF. This information may be used by the AMF to determine the delayed paging response window.

In a step 2 of the delayed paging operation, the UE 108 may initiate a Registration Request, indicating to the AMF that UE is delayed paging capable.

In a step 3 of the delayed paging operation, the AMF may obtain UE subscription information to verify the UE attributes and the subscribed service characteristic information. The AMF may obtain delayed paging response service information from the subscription information.

In a step 4 of the delayed paging operation, the AMF may accept the registration request from the UE 108 and return a delayed paging response window. The AMF may take into account the subscription information when determining the delayed paging response window.

In a step 5 of the delayed paging operation, when an AF wants to exchange delay tolerant data with the UE 108, the AF may invoke downlink Nnef_DataTransfer (external UE Id, delayed_paging_ind). The delayed_paging_ind parameter may be present when the AF request is for delayed paging.

In a step 6 of the delayed paging operation, the NEF may derive the UE identity from UE's External identifier and trigger a Namf_Communication_N1N2_message_transfer service operation.

In steps 7 and 8 of the delayed paging operation, when AMF receives the Namf_Communication_N1N2MessageTransfer with delayed paging indication, the AMF may send a paging message to the UE 108 with delayed paging indicator. The base station 104 may be used to relay the paging message to the UE 108. The AMF may page the UE 108 in registration area granularity in order to avoid the case where the UE 108 has moved out of the paging area, e.g. the last known cell or tracking area.

In steps 9 and 10 of the delayed paging operation, after receiving the paging message with delayed paging indication, the UE 108 may delay the response to the paging message if current radio conditions are not good (e.g., based on UE implementation or radio signal quality thresholds configured in the UE 108) until better radio conditions within the delayed paging response window. If signal quality thresholds are used for the UE 108 to decide when the radio condition are good or not good, the UE 108 may be configured with lower signal quality thresholds so that the UE 108 employs the paging delay behavior only when the current radio coverage is really bad or the worst coverage (e.g. the UE 108 is close to cell borders or coverage hole). This way the chances for the UE 108 to get better radio coverage conditions before the delayed paging response window expires are much higher. In some embodiments, the UE 108 may decide to delay the response to the paging message based on other data related to the radio conditions.

For example, the UE 108 may have determined trends of the radio conditions based on a location of the UE 108 and/or time of day. The trends may be used by the UE 108 to predict that the radio conditions may improve. For example, the UE 108 may determine that the current radio conditions are poor, but that the UE 108 has a location that is moving toward a position previously determined to have good radio conditions. Other mechanisms for determining that the radio condition may improve may be used without deviating from the embodiments described herein.

In a step 11 of the delayed paging operation, the expected Paging Response/Service Request from the UE 108 may be received within the delayed paging response window. If the paging response is not received after the delayed paging response window timer expires, the AMF may fall back to normal paging and will re-page the UE 108 with normal paging.

In a step 12 of the delayed paging operation, the AMF may notify the AF about the UE response to the delayed paging.

As illustrated in FIG. 2, the UE 108 may avoid transmitting data when such a data transmission would utilize high transmission power to reach the base station with a reasonably low error rate. Therefore, if the needed transmission power is high (e.g., when poor radio channel exists) during the initial duration for a paging response and/or a time of subsequent DL operation associated with the paging message may be increased, and there is a high possibility that the condition of the radio network between the UE 108 and the base station 104 may improve (e.g., a path loss of the network may decrease) during the allowed window, it may be preferable to delay the transmission. Poor radio channel conditions may be caused by, for example, fading, intersymbol interference, co-channel interference, low SNR, interference from neighboring base stations, and/or other channel degradation conditions.

Though FIG. 2 illustrates one embodiment of Delayed Paging, it will be understood that the details of FIG. 2 are merely examples, and that other and/or additional operations may be used to accomplish the ability to delay a response to a paging message in a wireless communication network, without deviating from the embodiments of the inventive concepts described herein.

Figure 3:
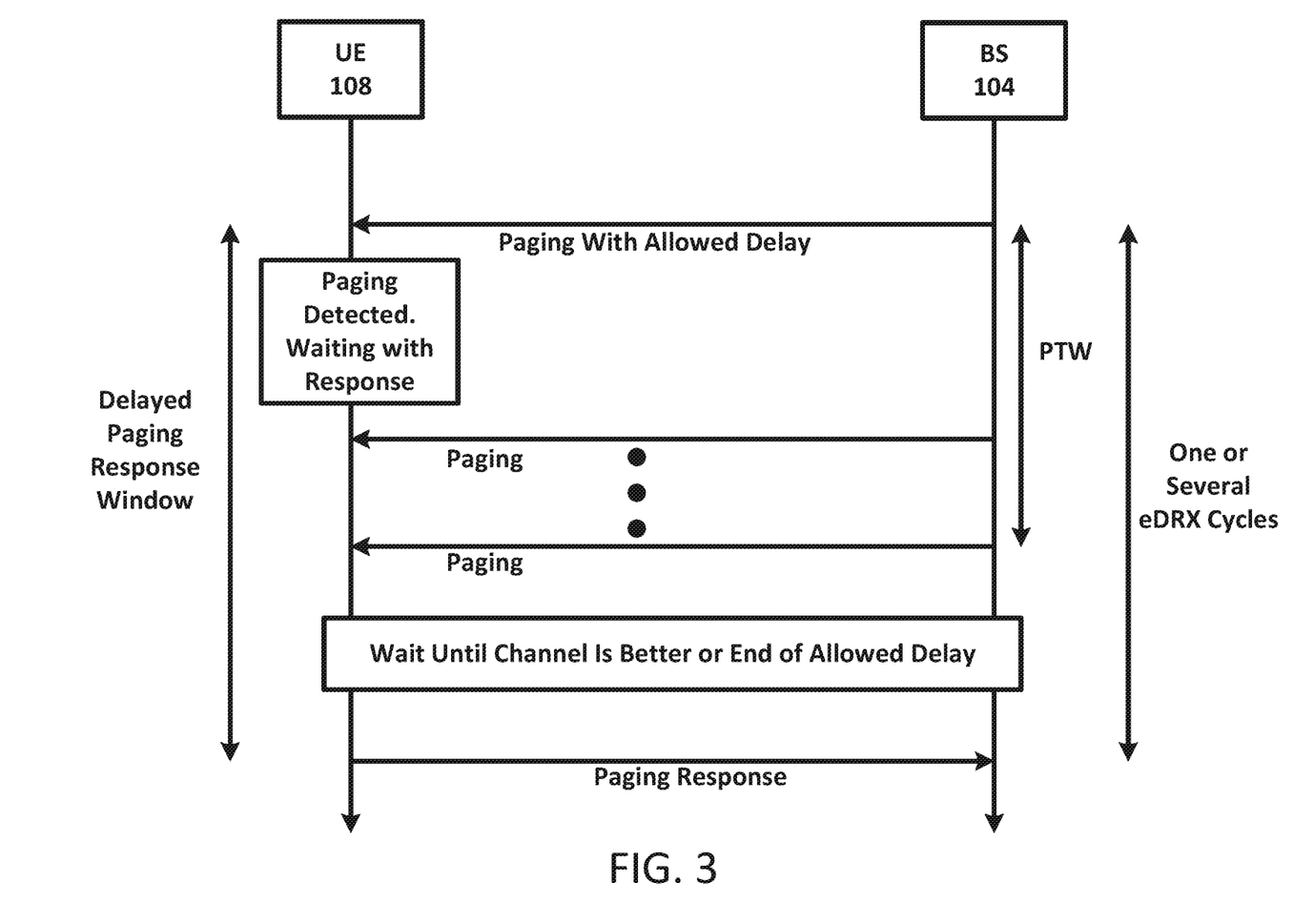
FIG. 3 is a block diagram that illustrates a retransmission scenario that may occur with Delayed Paging.

Various embodiments described herein may arise from the recognition that one challenge with the Delayed Paging proposal is that typically the paging escalation (sending a paging message in a wider area) may take place during the Paging Time Window (PTW). The PTW is a relatively short time period. It may be, for example, six DRX cycles, where each DRX cycle may be 1.28 to 2.56 s. FIG. 3 is a block diagram that illustrates a retransmission scenario that may occur with Delayed Paging. As illustrated in FIG. 3, when the network does not receive a paging response it may assume that the paging message has not been detected by the UE 108, and the network may continue to page the UE 108. In some embodiments, the retransmission of the paging message may be controlled by the base station 104 and/or elements in the core network 220. Thereby the network continues to send a paging message in the cell in the next paging occasion. After a few paging occasions (depending on the implementation of the network), the paging message may be sent in the whole tracking area as well. For example, during a given PTW the base station 104 may transmit two paging messages in the last known cell of the UE 108, two paging messages in neighboring cells, and two paging messages in the registered area (many cells). This repetition may cause interference, may take capacity of the network, and, since the paging message may be sent to all UEs in a paging group, the paging message may force other UEs to read the paging message and consume power. FIG. 3 illustrates the wasted paging messages sent from the base station 104 and/or other base stations in the network.

Delaying pages response may improve overall power performance. For example, Table 1 illustrates various variables for a model of the overall power consumption of the device.

TABLE 1

| Parameter | Value | Comments |
|---|---|---|
| $P_{Rx}$ | 1 unit/ms | Power consumed for reception. For simplicity, it applies during both $T_{prepare}$ and $T_{on-duty}$. |
| $P_{Tx}$ | 1-4 unit/ms | Power consumed for transmission, which is transmit power relevant. The value is 1 unit/ms when transmit power is 0 dBm and below, and is 4 unit/ms when transmit power is 23 dBm. Linearly scaled with transmit power in between 1 mW and $10^{2.3}$ mW. |
| $P_{sleep}$ | 0.01 unit/ms | Power consumed during sleep mode, including power consumed for low accuracy clock and memory maintaining, leakage current (e.g. caused by power management unit), etc. |
| $T_{prepare}$ | 34 ms | Time for UE preparation, which consists of the warm-up time, cell search and synchronization time. Here, the value refers to the minimum requirement for UE Secondary Cell (SCell) activation (assuming the SCell can be successfully detected on the first attempt). |
| $T_{on-duty}$ | 1 or 2 ms | Time that UE is on duty. For idle mode, the value is 1 ms (one paging occasion). For connected mode, it is assumed that the value is configured as 2 ms (onDurationTimer). |
| $T_{shutdown}$ | 0 ms | Time for UE shutdown. Here, it is omitted because generally the value is less than 0.5 ms. |

In Table 1, the relative values of power used during reception and transmission that are given. For example, Table 1 illustrates that transmissions at maximum transmission power in this model consumes four times as much power as receiving. Also, if the needed transmission power decreases by 6 dB, the power consumed for transmission may decrease by a factor 0.44.

The model illustrates that when the UE 108 wakes up, it may take a long time to prepare for operations (e.g., several milliseconds). Based on the small difference between receiving and transmitting power consumption, it is clearly not beneficial to just add more wakeups in order to check the condition of the radio network (e.g., the estimated path loss) to enhance the transmitted power consumption.

The power consumption based on the power model of Table 1 transmitting with a maximum transmission power is illustrated in Table 2.

TABLE 2

Relative power levels of receiving and transmitting
in different activities

|  | Paging without response | Paging with paging response | Paging with RRC Connection setup |
|---|---|---|---|
| Rx | $(T_{prepare} + T_{on-duty})*P_{Rx} = 36$ | $(T_{prepare} + T_{on-duty})*P_{Rx} = 36$ | $(T_{prepare} + T_{on-duty} + 60 \text{ ms}) * P_{Rx} = 96$ |
| Tx | 0 | 1 ms $*P_{Tx} = 4$ | 5 ms $*P_{Tx} = 20$ |
| Total Energy (units*$10^{-3}$ s) | 36 | 40 | 116 |

Table 2 illustrates that power is consumed in both receiving (Rx) and transmitting (Tx) when setting up the paging response. In many devices (e.g., CIoT), the device is sending up data when paged so as to receive data in a DL. For example, a paging message may be used to update the software in the UE 108. When the paging message is connected with a data download (e.g., a software download), degraded channel conditions may result in the available datarate being reduced. Assuming a software download of 256 kB, the download time to a particular device (e.g., a CIoT Cat M1 UE) may be around 2 s at a maximum rate. With degraded channel conditions in enhanced coverage (EC) the coding rate may be reduced and the paging messages may be repeated. As a result, the download time may increase substantially. Therefore, the UE power may be reduced if the network can wait to download the data (e.g., the software) to the UE until better radio conditions are present.

Table 3 illustrates the energy used in three different use cases where the assumed download time 2, 4 or 20 s due to different channel conditions

TABLE 3

Power consumption when downloading for different coverages.

| Channel Condition | Energy in receiver (From Table 1) | Energy used by transmitter (From Table 1) | Total energy (units*s) |
|---|---|---|---|
| Coverage 1 (2 s) | (0.036 + 0.060 + 2)*1 = 2.096 | (0.005 + 0.1*2)*4 = 0.82 | 2.916 |
| Coverage 2 (4 s) | (0.036 + 0.060 + 4)*1 = 4.096 | (0.005 + 0.1*4)*4 = 1.62 | 5.716 |
| Coverage 3 (20 s) | (0.036 + 0.060 + 20)*1 = 20.096 | (0.005 + 0.1*20)*4 = 8.02 | 28.116 |

As can be seen in Table 3, as the channel conditions degrade, the power utilized for the same transmission increases. Thus, there is a technical improvement in terms of reduced power consumption when transmissions are delayed until radio conditions are improved. Similarly, delaying paging responses, including paging responses that may result in data transmission, benefit from delaying until radio conditions improve.

Figure 4:
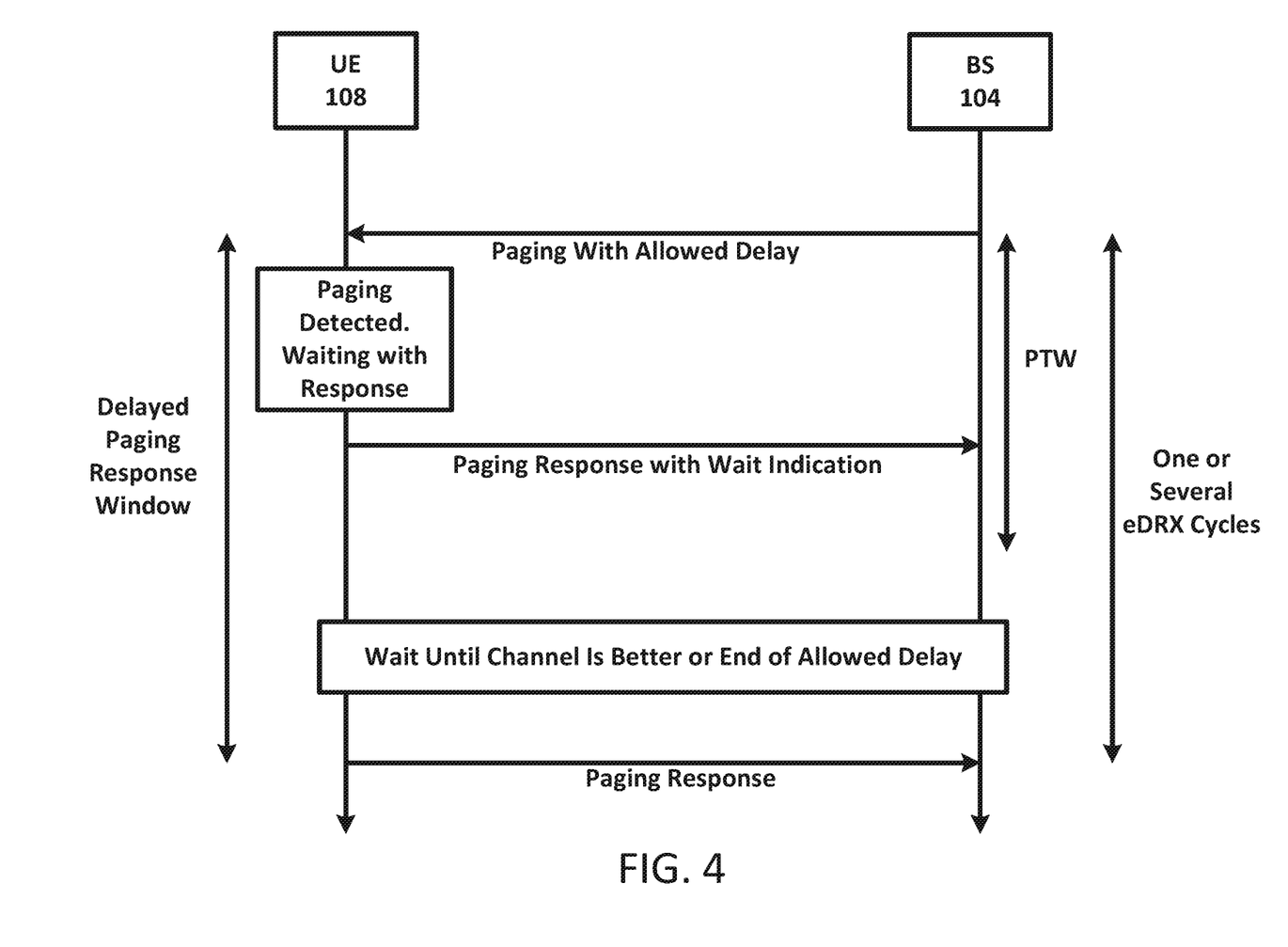
FIG. 4 is a block diagram that illustrates a Delayed Paging operation including a wait indication, according to some embodiments described herein.

The inventive concepts described herein result from a realization that power consumption may be improved on the UE 108 if, when the UE 108 is paged in eDRX and the UE 108 estimates that the propagation channel will improve during the Delayed Paging period, the UE 108 may respond to the base station with a wait indication. As a result, the network does not need to retransmit a paging message to the UE 108 during subsequent paging occasions in the Paging Time Window (PTW) until the UE 108 responds. In some embodiments, the wait indication may further diminish and/or eliminate the pages might be escalated into a larger paging area. FIG. 4 is a block diagram that illustrates a Delayed Paging operation including a wait indication, according to some embodiments described herein.

Upon receiving a paging message from a base station 104, the UE 108 may estimate that the propagation channel will improve during the delayed paging response window. As illustrated in FIG. 4, the UE 108 may respond with a wait indication to the base station 104 instead of providing a normal paging response or waiting without providing a response. In some embodiments, the wait indication may be provided as part of a connection procedure (e.g., connection setup) between the UE 108 and the base station 104. In some embodiments, when the base station 104 and/or core network 220 receive a wait indication from the UE 108, a retransmission of the paging message to the UE 108 may be delayed. In some embodiments, the delay of the retransmission of the paging message to the UE 108 may be indefinite. For example, in some embodiments, after receiving the wait indication from the UE 108 in response to a paging message, a retransmission of the paging message may be delayed beyond the delayed paging response window, such that the retransmission of the paging message is not performed. In some embodiments, the UE 108 may transmit more than one wait indication to the base station 104. For example, the UE 108 may transmit additional wait indications during the delayed paging response window so that the base station 104 may be aware that the UE 108 is available, but that that channel conditions have not yet improved sufficiently such that a further delay in responding to the paging message is warranted. In some embodiments, the base station 104 may transmit the additional wait indications to the core network 220 so that the core network 220 may be aware of the status of the UE 108.

By using the wait indication, the network does not need to send more paging messages to the UE 108 and thereby the other UEs in the paging group will not need to check whether the paging message was for them during the delayed paging response window. The power consumption in the UE 108 may increase marginally by this extra transmission (e.g., the wait indication), as shown in Table 2 and Table 3. However, since the delayed paging may decrease the download time of subsequent data by delaying the downloading until the channel condition improves, the overall UE power reduction may be large.

In some embodiments, the base station 104 may notify an application server in the core network 220 that the UE 108 is reachable but in poor coverage and the UE 108 will respond later to the application server once the radio condition improves and/or delayed paging response window ends. The application server may include functionality performed by, for example, the AF illustrated in FIG. 2. This message to the application server may provide an additional technical benefit beyond just delaying the paging response to the network.

By using the wait indication of the inventive concepts, the power consumption during the software download may be improved and unnecessary paging messages may be reduced and/or eliminated. In addition, the power savings may extend beyond the UE 108 that is paged to include all other UEs in the same paging group. Furthermore, the network may save valuable paging resources. In some embodiments, the application server may become aware that the UE 108 is in a poor radio condition and may respond later for completing the interaction with the application server.

Though the discussion herein has provided an example of power savings that may result from a software download, this is only an example to illustrate the inventive concepts, and the embodiments described herein are not limited by this example. Other scenarios may also result in power savings. For example, the application server may wish to provide an operation that will result in a UL data transmission from the UE 108. For example, the application server may wish to check a camera located in a moving vehicle. The power saving feature described herein are not limited to large data UL and/or DL. The inventive concepts may also provide a technical benefit for smaller downlink data, and may be advantageous as a result of power savings from a reduction in unnecessary paging messages as a result of the wait indication described herein.

In some embodiments, the wait indication may be provided as part of a connection procedure and/or random access procedure between the UE 108 and the base station 104. In some embodiments, the wait indication may be performed by using a special random access preamble and/or modifying a message of the random access procedure. Among the transport channels between the UE 108 and base station 104, there is a RACH (Random Access Channel) which is used to transmit data having relatively short length via the uplink. In some embodiments, the RACH is used when a UE 108, which has not been allocated any dedicated radio resources, has a signaling message or user data that needs to be transmitted via the uplink, or is used when the base station (eNB/gNB) 104 indicates to the UE 108 that a random access procedure is to be performed. By using the connection procedures between the UE 108 and the base station 104 for the wait indication, the UE 108 may acknowledge the paging message, but does not need to establish a connection all the way to the core network 220 (e.g., the application server). Instead, the UE 108 can send a short message to the base station (eNB/gNB) 104 and go directly to sleep. The network may then handle all the other communication/notification to the application server, thus preserving power on the UE 108.

The UE 108 may perform a random access procedure, for example, when the UE 108 performs an initial connection with the base station 104 if there is no RRC connection. In some embodiments, the UE 108 may perform a random access procedure when the UE 108 first accesses the target cell in a handover procedure. In some embodiments, the UE 108 may perform a random access procedure when requested by a command from the base station 104. In some embodiments, the UE 108 may perform a random access procedure if time synchronization of the uplink does not match. In some embodiments, the UE 108 may perform a random access procedure as a recovery procedure when there is a radio link failure or a handover failure. A description of the random access procedure is included, for example, in Clause 10.1.5 of "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," V15.3.0 (2018-09), the contents of which are included herein by reference.

The random access procedure may include four messages. The first message, Msg1, may be sent from the UE 108 to the base station 104. The Msg1 may be an RACH request, and may include an RACH preamble. As part of the Msg1, the UE 108 may provide its own identity to the network so that network can address it in a subsequent step. The identity which UE will use is called RA-RNTI (Random access radio network temporary identity). If the UE 108 does not receive any response from the network, the UE may increase its power and send the RACH preamble again.

The base station 104 will next send a second message, Msg2, to the UE 108. The Msg2, a Random Access Response, provides additional data for communication to the UE 108, including another identity for the UE 108 for further communication with the base station 104.

The UE 108 will send a third message, Msg3, to the base station 104. The third message Msg3 may include an RRC connection request message, and provides additional connection information of the UE 108 to the base station 104.

The base station 104 will complete the random access procedure with a fourth message, Msg4, which provides, among other things, additional identification information to the UE 108.

In some embodiments, the wait indication may be provided as a special RACH preamble between the UE 108 and the base station 104. Thus, in response to the paging message from the base station 104, the UE 108 may response with a Msg1 including a special preamble that is identified by the base station 104 as a wait indication. In this way, the UE 108 may indicate that the UE 108 has received the paging message and intends to delay the response thereto. For example, a paging message between the base station 104 and the UE 108 may include an SAE-Temporary Mobile Subscriber Identity (S-TMSI) of the UE 108 and up to sixteen other S-TMSI values of other UEs in the paging group. In some embodiments, after reading the paging message, the wait indication from the UE 108 may include a preamble based on the S-TMSI, or a reference (e.g., ID #4 in the paging message) to the S-TMSI in the previously-received paging message, into the RACH preamble transmitted from the UE 108 to the base station 104.

Though the wait indication is described herein as a modification to elements of the random access process, the embodiments described herein are not limited thereto. As will be understood by one of ordinary skill in the art, other mechanisms may be used to provide a wait indication from the UE 108 to the base station 104 without deviating from the inventive concepts.

In some embodiments, the wait indication may be provided as an additional command between the UE 108 and the base station 104. For example, the wait indication may be provided by sending a wait indication as part of a Msg3 message. For example, the Msg3 message described herein may be modified such that the base station 104 will understand that the Msg3 message includes a wait indication instead of, or in addition to, an RRC connection request. For example, in some embodiments, the Msg3 message may be modified to include an RRC_WAIT command designation. By transmitting the Msg3 message containing the RRC_WAIT command designation, the UE 108 may indicate that the paging message has been received and that a response to the paging message will be delayed. Upon receiving the Msg3 message containing the RRC_WAIT command designation, the base station 104 may delay retransmission of the paging message to the UE 108 and/or delay escalation of the paging messages during the delay response window. In some embodiments, after the base station 104 has received the RRC_WAIT, then the base station 104 may respond with an additional RRC message (e.g., RRC_REJECT) with a cause value that the wait was accepted. The UE 108 may then go back to sleep.

In a wireless communication network in which Delayed Paging response is supported for paging messages, the inventive concepts described herein provide multiple technical advantages. For example, when the UE 108 estimates that power can be saved by delaying a response to a paging message from a base station 104, the UE 108 may send a wait indication indicating that the UE 108 will delay the response to the paging message. For example, delaying the message may provide a power savings to the UE 108. As a result, the base station 104 may be informed that the response to the paging message will be received later, and the base station 104 will not have to send any further page messages to the UE 108. Consequently, paging resources may be reduced, which may be especially important in scenarios in which the page message would otherwise be escalated into a larger paging area. A further technical advantage is that other UEs in the same paging group will not received unnecessary paging messages and/or be woken up to check whether a paging message was intended from them. A further technical advantage is that the wait indication described herein may provide an opportunity to inform an Application Server about the UE status and that the UE 108 may be available to respond at a later time.

Figure 5A:
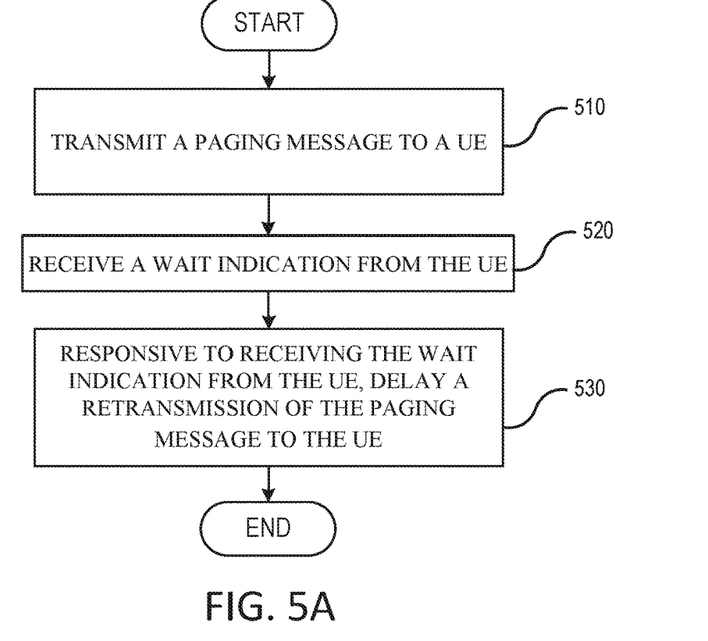
FIG. 5A is a flowchart of operations for managing a paging message for a UE, according to some embodiments described herein.

FIG. 5A is a flowchart of operations for managing a paging message for a UE 108, according to some embodiments described herein. A method according to the inventive concepts may include block 510 to transmit a paging message to a UE. For example, as discussed with respect to FIGS. 2 and 4, a base station 104 and/or a core network 220 may transmit a paging message to a UE 108.

In block 520, the base station 104 and/or core network 220 may receive a wait indication from the UE 108. In some embodiments, the wait indication may be provided as part of a modification of a random access operation between the UE 108 and the base station 104. For example, in some embodiments, the wait indication may be provided by using a special random access preamble and/or modifying a message of the random access procedure.

In block 530, the base station 104 and/or core network 220 may, responsive to receiving the wait indication from the UE 108, delay a retransmission of the paging message to the UE 108. In some embodiments, the base station 104 and/or core network 220 may delay retransmission of the paging message to the UE 108 during the delay response window.

Figure 5B:
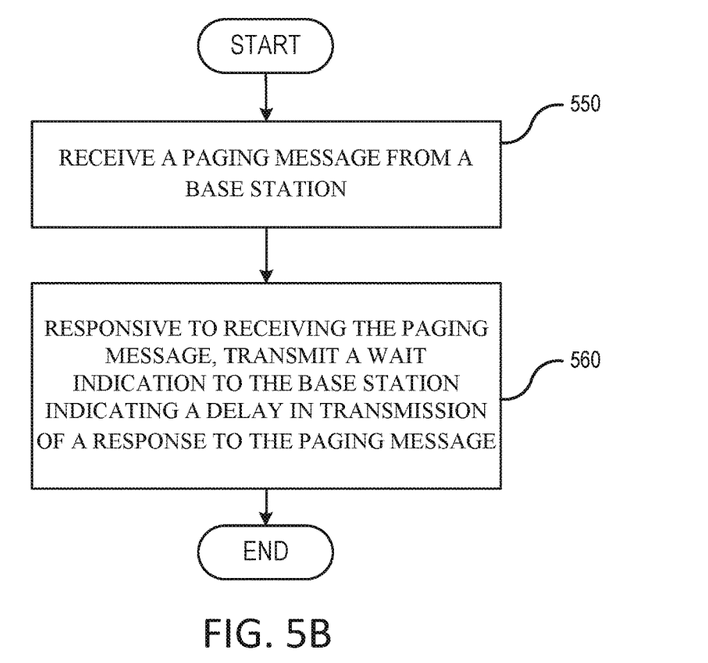
FIG. 5B is a flowchart of operations for operating a UE, according to some embodiments described herein.

FIG. 5B is a flowchart of operations for operating a UE 108, according to some embodiments described herein. A method according to the inventive concepts may include block 550 to receive a paging message from a base station 104. For example, as discussed with respect to FIGS. 2 and 4, a UE 108 may receive a message from a base station 104 and/or a core network 220.

In block 560, the UE may, responsive to receiving the paging message, transmit a wait indication to the base station 104 to delay a retransmission of the paging message. In some embodiments, the wait indication may be provided as part of a modification of a random access operation between the UE 108 and the base station 104. For example, in some embodiments, the wait indication may be provided by using a special random access preamble and/or modifying a message of the random access procedure. In some embodiments, the UE 108 may transmit the wait indication responsive to determining that a condition of the radio network between the UE 108 and the base station 104 is likely to improve within a duration of a delayed paging response window.

Figure 6:
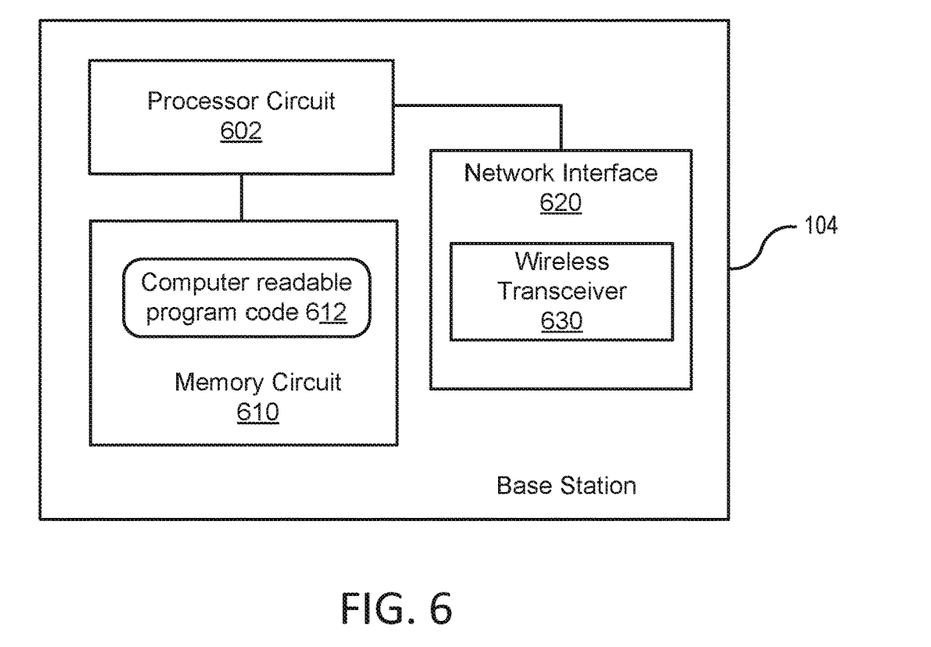
FIG. 6 is a block diagram that illustrates a base station 104 that is configured to perform operations according to one or more embodiments described herein.

FIG. 6 is a block diagram that illustrates a base station 104 that is configured to perform operations according to one or more embodiments described herein. The base station 104 comprises a processor circuit 602, a memory circuit 610, and a network interface 620. The network interface 620 comprises a wireless transceiver 630 configured to implement wireless communication protocols including, but not limited to, those supported by 5G NR wireless communication networks. The processor circuit 602 may comprise one or more data processing circuits, such as a general purpose and/or special purpose processor, e.g., microprocessor and/or digital signal processor. The processor circuit 602 is configured to execute the computer readable program code 612 in the memory circuit 610 to perform at least some of the operations described herein as being performed by a base station 104.

Figure 7:
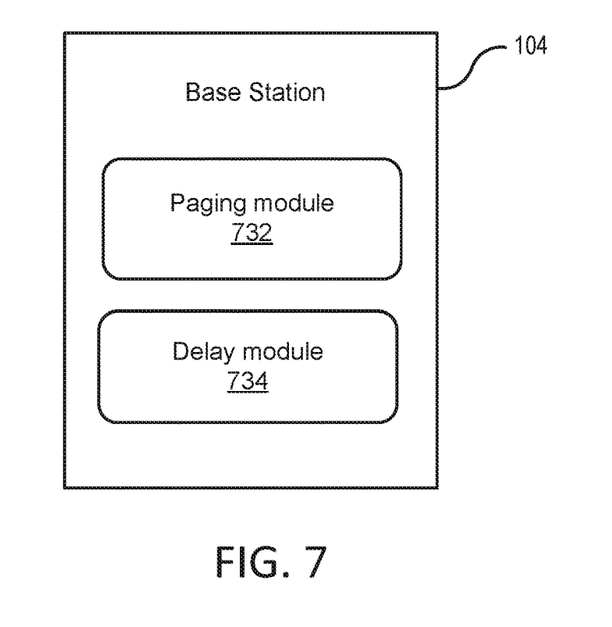
FIG. 7 is a block diagram that illustrates functional modules in a base station 104 according to some embodiments described herein.

FIG. 7 is a block diagram that illustrates functional modules in a base station 104 according to some embodiments described herein. The base station 104 comprises a paging module 732, which is configured to perform operations associated with sending and receiving paging messages to a UE 108 as described herein, and a delay module 734, which is configured to delay retransmission of paging messages to a UE 108 responsive to receiving a wait indication from the UE 108, as described herein.

Figure 8:
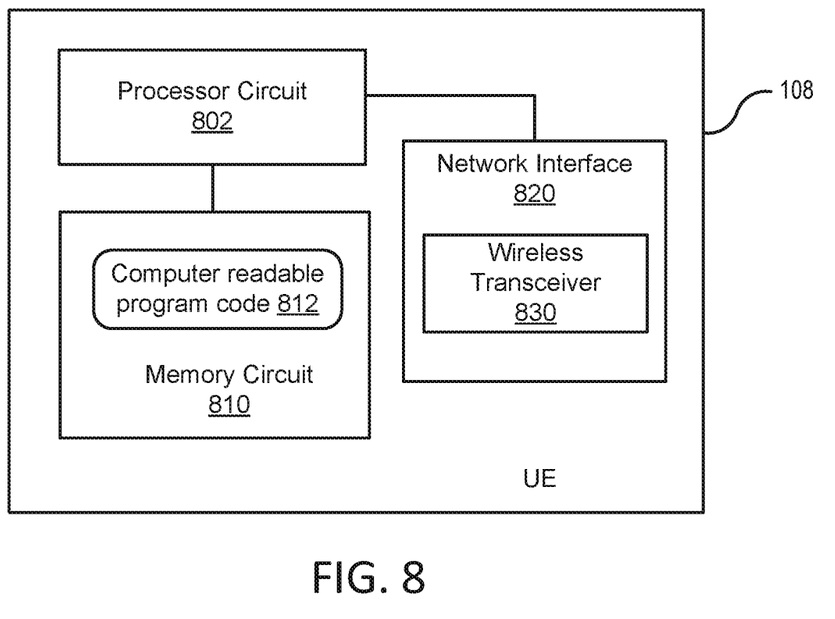
FIG. 8 is a block diagram that illustrates a UE 108 that is configured to perform operations according to one or more embodiments described herein

FIG. 8 is a block diagram that illustrates a UE 108 that is configured to perform operations according to one or more embodiments described herein. The UE 108 comprises a processor circuit 802, a memory circuit 810, and a network interface 820. The network interface 820 comprises a wireless transceiver 830 configured to implement wireless communication protocols including, but not limited to, those supported by 5G NR wireless communication networks. The processor circuit 802 may comprise one or more data processing circuits, such as a general purpose and/or special purpose processor, e.g., microprocessor and/or digital signal processor. The processor circuit 802 is configured to execute the computer readable program code 812 in the memory circuit 810 to perform at least some of the operations described herein as being performed by a UE 108.

Figure 9:
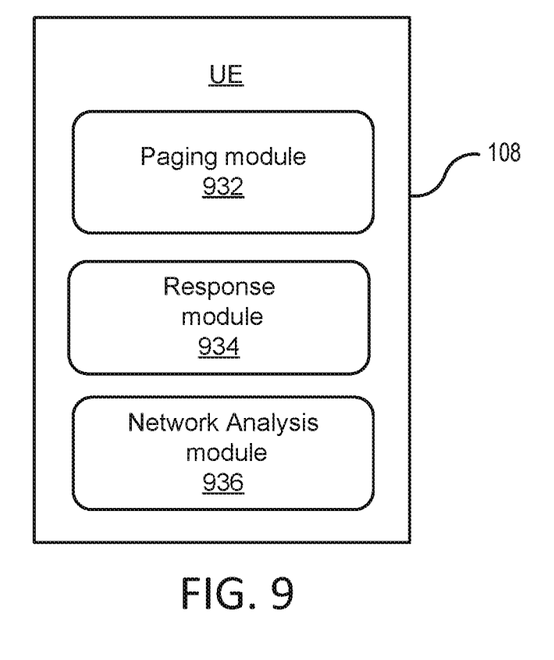
FIG. 9 is a block diagram that illustrates functional modules in a UE 108 according to some embodiments described herein.

FIG. 9 is a block diagram that illustrates functional modules in a UE 108 according to some embodiments described herein. The UE 108 comprises a Paging module 932, which is configured to send and receive paging messages from the base station 104, including the ability to send delayed paging messages, as described herein. The UE 108 further comprises Response module 934 that is configured to provide a wait indication as a response to a paging message received from the base station 104, as described herein. The UE 108 further comprises a Network Analysis module 936 that is configured to analyze a network, such as a radio network between the UE 108 and the base station 104, to develop a prediction as to whether a condition of the radio network will improve, as described herein. In some embodiments, as described herein, whether to delay a response to a paging message from the base station 104, and to send a wait indication message indicating the delayed response, may be performed based on the analysis of the radio network performed by the Network Analysis module 936.

According to some embodiments of the inventive concepts, a method of operating a user equipment (UE) in a wireless communication network includes receiving a paging message from a network node, and responsive to receiving the paging message, transmitting a wait indication to the network node indicating a delay in transmission of a response to the paging message.

In some embodiments, the paging message comprises a delayed paging indicator that indicates that a delayed response to the paging message is supported.

In some embodiments, the method further includes transmitting a support message indicating support for a delayed response to the paging message.

In some embodiments, the wait indication is provided as part of a connection procedure between the UE and the network node.

In some embodiments, the wait indication comprises a random access channel (RACH) preamble.

In some embodiments, the wait indication comprises a portion of a random access channel (RACH) Msg3.

In some embodiments, the wait indication is transmitted as part of a random access procedure between the UE and the network node In some embodiments, the wait indication is transmitted in response to a random access channel (RACH) random access response that is received by the UE from the network node.

In some embodiments, the wait indication is a first wait indication, and the method further includes transmitting a second wait indication from the UE to the network node.

In some embodiments, the second wait indication indicates a further delay based on a channel condition between the UE and the network node.

In some embodiments, the method further includes transmitting a registration message indicating support for a delayed response to the paging message.

In some embodiments, transmitting the wait indication is based on a channel condition between the UE and the network node.

According to some embodiments of the inventive concepts, a UE used in a wireless communication network performs operations including receiving a paging message from a network node over the wireless communication network, and responsive to receiving the paging message, transmitting a wait indication to the network node indicating a delay in transmission of a response to the paging message. In some embodiments, the UE comprises a processor, and a memory coupled to the processor, the memory comprising computer readable program code embodied therein.

According to some embodiments of the inventive concepts, a computer program product includes a tangible, non-transitory computer readable storage medium comprising computer readable program code embodied therein, the computer readable program code including computer readable code to receive a paging message at a User Equipment (UE) from a network node over a wireless communication network, and computer readable code to transmit, responsive to receiving the paging message, a wait indication to the network node indicating a delay in transmission of a response to the paging message.

According to some embodiments of the inventive concepts, a method for managing a paging message for a UE in a wireless communication network includes transmitting the paging message to the UE in the wireless communication network, receiving a wait indication from the UE, and delaying a retransmission of the paging message to the UE responsive to receiving the wait indication from the UE.

In some embodiments, the paging message comprises a delayed paging indicator that indicates that a delayed response to the paging message is supported.

In some embodiments, the paging message comprises the delayed paging indicator responsive to a determination that a response to the paging message is delay tolerant.

In some embodiments, the wireless communication network comprises a network node, and the wait indication is provided as part of a connection procedure between the UE and the network node.

In some embodiments, the wait indication comprises a random access channel (RACH) preamble.

In some embodiments, the wait indication comprises a portion of a random access channel (RACH) Msg3.

In some embodiments, the wait indication is transmitted as part of a random access procedure between the UE and the network node In some embodiments, the wireless communication network includes a network node, and the method further includes receiving the wait indication in response to a random access channel (RACH) random access response that is transmitted from the network node to the UE.

In some embodiments, the wireless communication network includes a core network, and the method further includes responsive to receiving the wait indication, transmitting a status message to the core network, wherein the status message indicates that the UE has provided a wait indication.

In some embodiments, the wait indication is a first wait indication, and the method further includes receiving a second wait indication from the UE.

In some embodiments, the second wait indication indicates a further delay based on a channel condition between the UE and the network node of the wireless communication network.

In some embodiments, the method further includes receiving a registration message from the UE indicating support for a delayed response to the paging message.

In some embodiments, the wait indication is based on a channel condition between the UE and the network node of the wireless communication network.

In some embodiments, the wait indication is received in response to the paging message that is transmitted from a network node to the UE.

According to some embodiments of the inventive concepts, a network node in a wireless communication network performs operations including transmitting a paging message to a user Equipment (UE) in the wireless communication network, receiving a wait indication from the UE, and responsive to receiving the wait indication from the UE, delaying a retransmission of the paging message to the UE. In some embodiments, the network node comprises a processor, and a memory coupled to the processor, the memory comprising computer readable program code embodied therein.

According to some embodiments of the inventive concepts, a computer program product includes a tangible, non-transitory computer readable storage medium comprising computer readable program code embodied therein, the computer readable program code including computer readable code to transmit a paging message to a user Equipment (UE) in a wireless communication network, computer readable code to receive a wait indication from the UE, and computer readable code to delay a retransmission of the paging message to the UE responsive to receiving the wait indication from the UE.

In the above-description of various embodiments, it is to be understood that the terminology used herein is for the purpose of describing particular embodiments only and is not intended to be limiting of the embodiments as described herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices), and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module," or variants thereof.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

What is claimed is:

1. A method of operating a user equipment (UE) in a wireless communication network, the method comprising:

receiving, by the UE, a paging message from a network node, wherein the paging message comprises a delayed paging indicator that indicates that a delayed response to the paging message is supported;

responsive to receiving the paging message, transmitting, by the UE, a wait indication to the network node indicating a delay in transmission of a response to the paging message received from the network node;

delaying, by the UE, sending of a paging response, until the channel conditions have improved based on expected power utilization by the UE; and transmitting, by the UE, prior to receiving an additional message from the network node, the paging response to the network node, when the channel conditions of the communication channel improve based on reduced expected power utilization by the UE.

2. The method of claim 1, wherein the wait indication is provided as part of a connection procedure between the UE and the network node.

3. The method of claim 1, wherein the wait indication is transmitted as part of a random access procedure between the UE and the network node.

4. The method of claim 1, wherein the wait indication comprises a random access channel (RACH) preamble.

5. The method of claim 1, wherein the wait indication comprises a portion of a random access channel (RACH) Msg3.

6. The method of claim 1, wherein the wait indication is a first wait indication, the method further comprising:
transmitting a second wait indication from the UE to the network node.

7. The method of claim 6, wherein the second wait indication indicates a further delay based on a channel condition between the UE and the network node.

8. The method of claim 1, further comprising:
transmitting a registration message indicating support for the delayed response to the paging message.

9. The method of claim 1, wherein transmitting the wait indication is based on a channel condition between the UE and the network node.

10. A computer program product, comprising:
a non-transitory computer readable storage medium comprising computer readable program code embodied therein, the computer readable program code comprising:
computer readable code to receive a paging message at a User Equipment (UE) from a network node over a wireless communication network, wherein the paging message comprises a delayed paging indicator that indicates that a delayed response to the paging message is supported;
computer readable code to transmit, by the UE, responsive to receiving the paging message, a wait indication to the network node indicating a delay by the UE in transmission of a response to the paging message received from the network node;
computer readable code to delay, by the UE, sending of a paging response, until the channel conditions have improved based on expected power utilization by the UE; and
computer readable code to transmit, by the UE, prior to receiving an additional message from the network node, the paging response to the network node, when the channel conditions of the communication channel improve based on reduced expected power utilization by the UE.

11. A method of a network node for managing a paging message for a user equipment (UE) in a wireless communication network, the method comprising:
transmitting the paging message to the UE in the wireless communication network, wherein the paging message comprises a delayed paging indicator that indicates that a delayed response to the paging message is supported;
receiving a wait indication from the UE indicating a delay by the UE in transmission of a response to the paging message that was transmitted by the network node;
delaying a retransmission of the paging message to the UE responsive to receiving the wait indication from the UE;
receiving, from the UE, prior to the retransmission of the paging message from the network node to the UE, a paging response that was sent by the UE when channel conditions improved based on reduced expected power utilization determined by the UE.

12. The method of claim 11, wherein the paging message comprises the delayed paging indicator responsive to a determination that a response to the paging message is delay tolerant.

13. The method of claim 11, wherein the wait indication is provided as part of a connection procedure between the UE and the network node.

14. The method of claim 11, wherein the wait indication is transmitted as part of a random access procedure between the UE and the network node.

15. The method of claim 11, further comprising:
receiving the wait indication in response to a random access channel (RACH) random access response that is transmitted from the network node to the UE.

16. The method of claim 11, wherein the wireless communication network comprises a core network, the method further comprising:
responsive to receiving the wait indication, transmitting a status message to the core network, wherein the status message indicates that the UE has provided the wait indication.

17. The method of claim 11, wherein the wait indication is a first wait indication, the method further comprising:
receiving a second wait indication from the UE.

18. The method of claim 11, further comprising:
receiving a registration message from the UE indicating support for the delayed response to the paging message.

* * * * *